United States Patent
Greene

(10) Patent No.: US 6,668,173 B2
(45) Date of Patent: Dec. 23, 2003

(54) INSTANT MESSAGE USER LOCATION TRACKING SYSTEM

(75) Inventor: Kenneth Philip Greene, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 490 days.

(21) Appl. No.: 09/737,720

(22) Filed: Dec. 15, 2000

(65) Prior Publication Data

US 2002/0077080 A1 Jun. 20, 2002

(51) Int. Cl.[7] ............................. H04Q 7/00
(52) U.S. Cl. ................. 455/445; 455/456; 455/561; 709/201; 709/207
(58) Field of Search ................. 455/414, 422, 455/445, 456, 457, 466, 556, 557, 561; 709/201, 202, 203, 204, 206, 207; 705/1, 14

(56) References Cited

U.S. PATENT DOCUMENTS

| | | | |
|---|---|---|---|
| 5,485,163 A | 1/1996 | Singer et al. | |
| 5,537,460 A | 7/1996 | Holliday, Jr. et al. | |
| 6,128,509 A | * 10/2000 | Veijola et al. | 455/556 |
| 6,301,609 B1 | * 10/2001 | Aravamudan et al. | 709/207 |
| 6,430,602 B1 | 8/2002 | Kay et al. | |

* cited by examiner

Primary Examiner—Thanh Cong Le
(74) Attorney, Agent, or Firm—Hisashi D. Watanabe

(57) ABSTRACT

In an Internet system having instant message capability each of the plurality of users is provided with a wired or wireless device. The wireless device transmits location data indicating its location or status update messages based on its location to an instant message server. In this invention a wireless device or server associates the location data with status update messages indicating the status and/or location of the users carrying the wireless devices in accordance with the received location information. The instant messages are then transmitted by the instant message server to other users of the instant message system.

20 Claims, 2 Drawing Sheets

INSTANT MESSAGE USER LOCATION TRACKING SYSTEM

FIELD OF THE INVENTION

This invention relates to a system for tracking the status and location of users of wireless devices and more particularly to a tracking system making use of the Internet and instant message (IM) technology.

BACKGROUND OF THE INVENTION

Today, many users of wired devices, (such as personal computers or workstations) and wireless devices (such as, PDAS, pagers, cellular telephones, etc.) are connected to the Internet. In some systems, the location and/or availability of users of some devices is tracked by having each individual update his status and (possibly) physical location whenever his status and/or physical location changes. In these systems, when the user arrives at his station, he updates his current status by entering or selecting a status message. The wired or wireless device in turn transmits an IM buddy list status update message to an IM server. The IM server then transmits the buddy list status update messages to other wired devices on the system where the status update message is displayed. The status update message entered or selected might for example be "available" or "at my desk."

Conventionally, when the status needs to be updated, the user enters a status change into the wired device indicating a new status, such as "not at my desk," "out to lunch," "on vacation" or other status messages indicating the specific location where the user intends to go. The problem is that the user needs to remember to update the status, for example, every time the user leaves his desk or upon returning to his desk. Also, if the user indicates a location at which the user can be reached and then makes an unscheduled trip to another location at which he potentially can be reached, the new location will not be reflected in the buddy list status seen by the other users. The result is that often the status message is not updated when it should be and other users are given incorrect information about the current status and/or location of each other.

Accordingly, there is a need for a system, which will automatically update the status or location of the individual whenever it changes.

DESCRIPTION OF A PREFERRED EMBODIMENT

Figure 1:
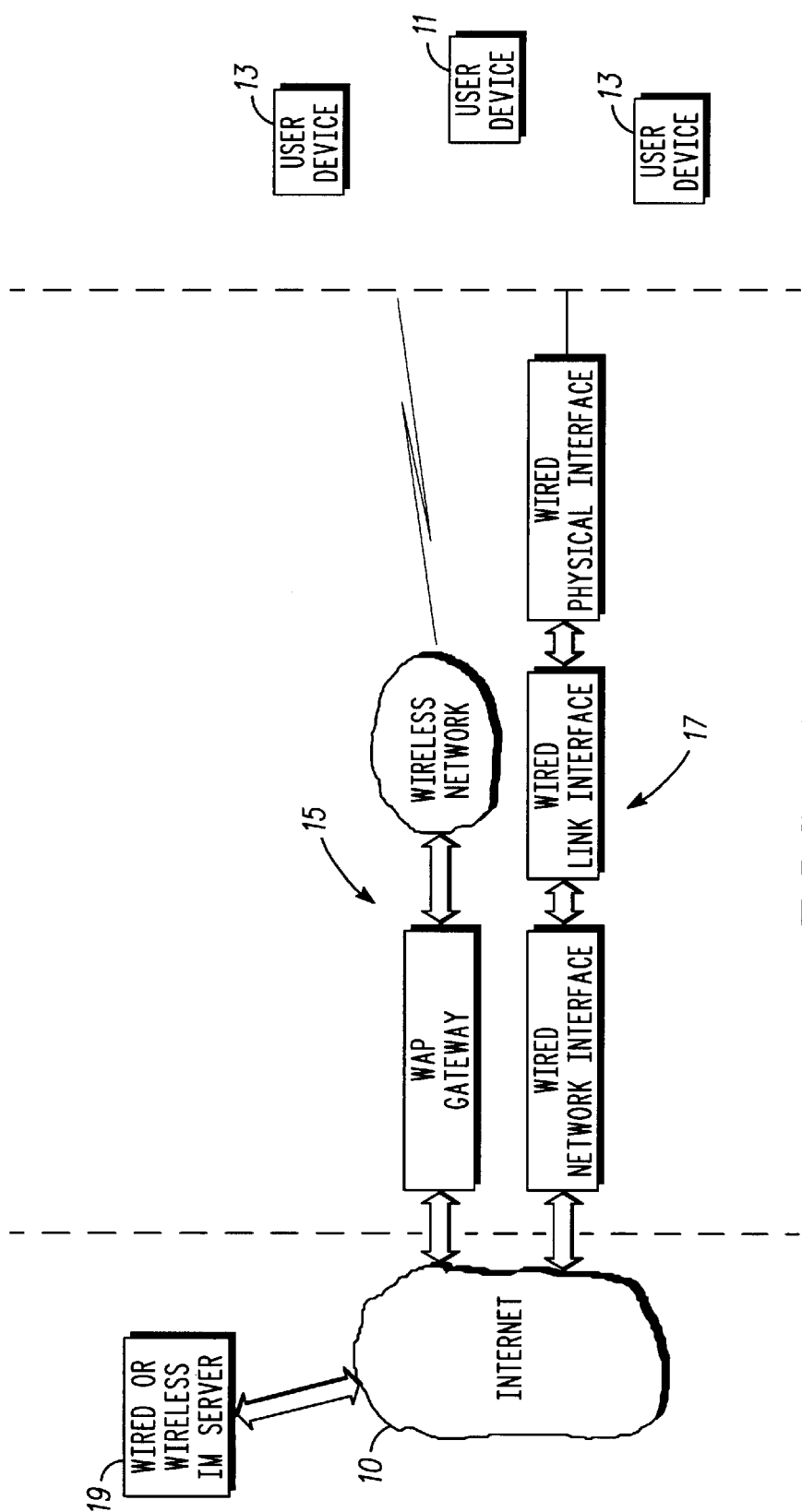
FIG. 1 is a block diagram illustrating a system in accordance with the present invention.

According to the present invention, status update messages relating to the position of a wireless device are automatically transmitted to wired or wireless devices that utilize an instant messaging (IM) feature over a network, such as the Internet. The wired or wireless devices, which have IM and message display capabilities, are connected via the Internet to an IM server. The IM server, which stores user profiles and preferences, sends status update messages to the wired or wireless devices, where such update messages are displayed as a part of the buddy list. According to one of the features of the present invention, determined position data (e.g., altitude, latitude and longitude) relating to the position of the wireless device is associated with user-defined location tags (e.g., "at home" or "in the office"). Thereafter, a status update message indicating the status and/or location of the user who carries the wireless device is sent to other wired or wireless devices, where the status update message is displayed.

In one embodiment, the wireless device autonomously determines its position, for example, using a built-in GPS receiver that provides position coordinate data. In another embodiment, a network-assisted method is used for determining the position of the wireless device, for example, by using methods such as Assisted GPS (AGPS) or Enhanced Observed Time Difference (EOTD).

Under one arrangement, the wireless device itself translates the position data to location tags and transmits the status update message to the IM server, which sends the status update message to other wired or wireless devices to be displayed. Under this arrangement, the system of the invention includes a radio receiver that receives the status update message transmitted from the wireless device and forwards the status update message via a wireless Internet access system to the IM server.

Under another arrangement, the wireless device transmits the position data to the IM server, where the IM server performs a position-to-location-tag translation that converts the position data into location tags. Alternatively, a separate intermediate proxy server can perform the position-to-location-tag translation.

Under one aspect of the invention, the wireless device repeatedly sends position data to the IM server, which converts the position data into location tags. Under another aspect, the wireless device converts the position data into to a location tag, and transmits the location tag to the IM server only when position changes enough to cause the location tag to change, thereby reducing the number of over-the-air transmissions. Under yet another aspect, the IM server determines the position of the wireless device and repeatedly forwards position data to the wireless device, for example using a network-assisted positioning method. The wireless device then translates the position data into location tags and transmits the status update message to the IM server, only when position changes enough to cause the location tag to change.

According to other more detailed features of the invention, the wireless device selects a status update message to be transmitted to the other wired or wireless devices in accordance with the location of the wireless device relative to a home location. Under this arrangement, a first status update message can be transmitted when the wireless device is in the vicinity of the home location, whereas a different message is transmitted when the wireless device is not in the vicinity of the home location. The different message can vary with the distance of the wireless device from the home location.

In the system of the present invention as shown in FIG. 1, the Internet 10 or equivalent computer network interconnects pluralities of wired devices 11 or wireless devices 13. The wired devices 11 access the Internet via a well-known wired Internet access network 17, such as a TCP/IP network. Each wireless device 13 is also provided with Internet access capability via a wireless Internet access network 15. Examples of such wireless network are already defined or are in the process of being defined by such standard bodies as WAP Forum, 3GPP and 3GPP2. As such, in one exemplary embodiment, the wireless devices 13 may be in the form of WAP-enabled cell phone, two-way pager, PDA or any other type of device that wirelessly communicates information over a network. Also, the hardware platform for implementing the present invention can be any proprietary or standard hardware that supports wireless links with the wireless devices. Examples of such platform can be those defined by IS-95, IS-136, iDEN, Bluetooth, GSM, etc.

Each wired or wireless device 11, 13 provides the capabilities to communicate with each other over the Internet including communicating IM messages amongst the wired or wireless device 11, 13 via an IM server 19. The IM server 19 gives each of the wired or wireless devices 11, 13 the capability of sending an instant message to each of the other wired or wireless devices 11, 13. Upon receipt, the wired or wireless devices 11, 13 can immediately display the instant messages. The wired and wireless devices 11, 13 also support buddy lists, which comprise lists with user identifications and statuses and/or locations of the users of each of the wired or wireless devices 11, 13.

The present invention can deploy any technology that supports PUSH protocols to send unsolicited IM messages to the wired and wireless devices 11, 13. For the wired communication of messages, well-know IM over TCP/IP technology can be used, where the wired devices 11 execute known IM client applications, such as those developed by America Online or Yahoo. For wireless communication of messages, wireless messaging protocols include short messaging service (SMS) and ReFlex messaging protocol developed by Motorola Inc., the assignee of the present invention. As such, the wireless devices 13 acting as client devices can execute wireless IM client applications that for example use wireless email over ReFLEX systems or SMS over GSM and CDMA systems. Also the present invention can deploy future versions of IM over WAP with WAP PUSH protocols where an IM WAP User Agent running under the WAP application environment (WAE) would be executed in a client wireless device 13. Although the protocols described above are examples of the protocols that can be used, the present invention can be applied with any other suitable standard or proprietary application protocol.

Figure 2:
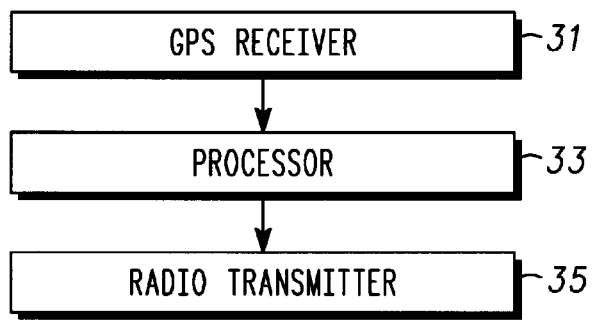
FIG. 2 is a block diagram of a wireless device used by the system of the present invention as shown in FIG. 1.

According to one feature of the present invention, a position detecting capability is provided with respect to at least one of the wireless devices 13. Under one embodiment, the wireless device 13 determines its position autonomously. As illustrated in FIG. 2, the position detecting capability is provided by means of an integrated global positioning system (GPS) receiver. In a well-known manner, the GPS receiver receives signals from satellites and determines the position of the wireless device 13. The GPS receiver provides determined position data typically in the form of altitude, latitude and longitude. Alternatively, the position detecting capability can be provided using a cell ID within a cellular embodiment of the system of the invention. Cell ID identifies the particular cell in which the wireless device 13 is located. The identified cell, having a known location, can then be used to provide the position of the wireless device 13 as being somewhere within that cell. In another embodiment, any of a well-known network-assisted position determination methods can be used to determine the position of the wireless device 13. Examples of such methods include EOTD, AFLT, A-GPS, etc. Under yet another embodiment, the IM server determines the position of the wireless device 13 by repeatedly polling an entity within the wireless network (e.g., the GSM Gateway Mobile Location Center (GMLC) or CDMA Mobile Positioning Center (MPC)) and converts the position data into location tags.

As stated above, the present invention associates position data with user defined location tags. In order to associate the position data, parameters that describe the position space represented by each location tag are stored in the entity that performs the position-to-location-tag conversion, i.e., a wireless device 13, IM server 19 or a proxy server. For example, a "home" location tag could be specified in terms of a geometric area such as the center and radius of a circle, the foci of an ellipse, or the width and length of a rectangle, for example using Parlay APIs (www.parlay.org).

As stated above, the wireless device position can be determined either autonomously or using a network-assisted positioning method. The wireless device 13 can repeatedly send position data to the IM server 19, which translates the position data into location tags and sends status update messages to the other wired or wireless devices 11, 13. Alternatively, the wireless device 13 can translate the position data into a location tag and transmit the location tag to the IM server only when wireless device position changes enough to cause the location tag to change. Moreover, the IM server 19 can determine the position of the wireless device 13 by repeatedly polling the wireless network (e.g., the GSM GMLC or CDMA MPC) and repeatedly forwarding position data to the wireless device. The wireless device 13 then translates these position data into location tags and sends status update message to the IM server 19 only when its position changes enough to cause the location tag to change.

The wireless devices 13 can transmit information, e.g., position data or status update message, by radio link to the wireless Internet access system 15. The wireless Internet access system (e.g. WAP Gateway) converts the received message from a specified format, (e.g., WAP format for transmission over the wireless network) and then transmits the message to the IM server 19 via the Internet (e.g., via HTTP). Subsequently, the IM server 19 sends status update messages to the wired or wireless device 11, 13 to be immediately available for display on the buddy lists of the users of such devices.

The particular status message transmitted depends upon the position data and indicates in words the status and/or location of the user in accordance with a format selected by the user. For example, one format selectable by the user provides the following information based on the location data. If the location data indicate that the user's location is in his office or at his desk, then the status update message would be "available." If the position data indicate that the user is within the premises of the business or offices of the business of the user, but not in the user's office, then the message will indicate the room or place in the business or office where the user is located. For example, status update message could be "in the cafeteria" or "in conference room A" or "in the reception area." If the position data indicate that the location is at the home of the user, then the status update message will be "at home." If the position data indicate that the location is outside of the business premises but in the same city, then the status update message can specify the city in which the user is located. At the option of the user, the status update message can indicate the specific address in the city at which the user is located. If the position data indicates that the wireless device 13 is outside the city in which the user's business is located, then the message would name the specific city to which the user has traveled, the message being for example "in Dallas," "in Paris," or "in Tokyo." Alternatively, the specific address in the city could be given, or, at the option of the user, the message could simply state "traveling." The location, identified by the message, (preferably) would be configurable by the user from coarse such as "in Texas," to medium such as "in Fort Worth, Tex.," to fine such as a specific address such as "at 5401 Beach Street, Fort Worth, Tex.," to micro giving the specific room in which the wireless device is located. Preferably, the user can also select a format to merely give a generic status indication such as "at home," "at work," "out of town," or "at work but away from desk." In each format, the status update message varies in accordance with the position of the wireless device 13 relative to a selected home location of the user carrying the wireless device 13. The home location can usually be the office or desk of the user and the wired or wireless device of the user is normally at the home location of the user.

Since the buddy list status update messages changes with the positions of the wireless devices 13, each user of the wired or wireless devices 11, 13 is given a series of updates on the status and/or location of the user carrying the wireless device 13 and the indications are provided automatically without the user having to manually update his status and/or location. The capability of indicating the status and/or location may be optionally turned off by the user for privacy reasons, either in the wireless device 13 or in the IM server 19.

FIG. 2 is an exemplary block diagram of the wireless device 13, which makes use of GPS to provide position data. As shown in FIG. 2, the wireless device 13 comprises a GPS receiver 31 which receives signals from satellites and converts these signals into an indication of latitude and longitude and altitude. In one embodiment, processor 33 uses the latitude and longitude and altitude information, together with the user's privacy and location resolution preference settings, to determine whether or not to update the buddy list status. As stated before, the process of updating the buddy list status can be initiated by the wireless device 13 or the IM server 19. When the position of the wireless device 13 changes by a predefined amount, and if the privacy setting permits, a new buddy list status update message based on the new location data is transmitted to other wired or wireless devices 11, 13. Within the wireless device 13, information (e.g., position data or status update messages) is transmitted by a transmitter 35 (by radio link) to a receiver of the wireless Internet access network 15. In one embodiment, the process of converting the longitude and latitude into a message and determining when to transmit the message can be repeated continuously. Therefore, the IM server 19 can always have up-to-date information on the location of each wireless device 13.

Figure 3:
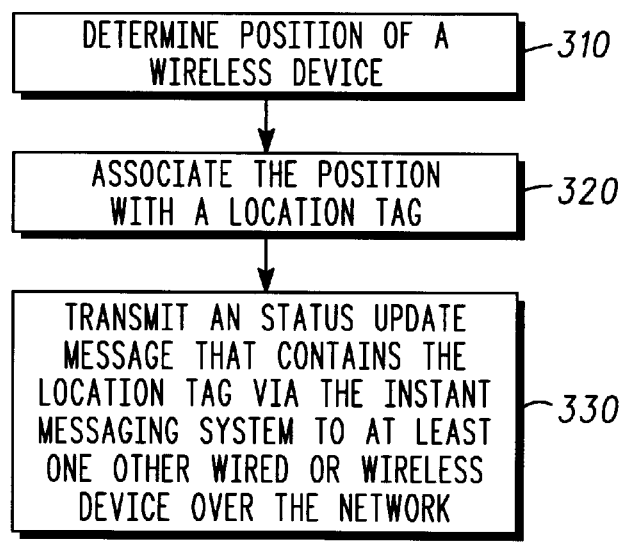
FIG. 3 is a flow chart of a method in accordance with the present invention.

Referring to FIG. 3, a flow chart for a method that updates status within a network in accordance with the present invention. As stated above, the network supports an instant messaging system for communicating instant messages amongst a plurality of wired or wireless devices. The method of the invention determines the position of a wireless device, block 310. Then, the position is associated with a location tag, block 320. A status update message that contains the location tag is transmitted via the instant messaging system to at least one other wired or wireless device over the network. A client device, such as the wireless device, or a server can associate the position data with the location tag. As stated above, the position data can be determined by the wireless device or it can be determined using a network-assisted positioning method.

From the above description, it will be appreciated that the method and apparatus of the invention solves the problem of providing status and location information of users instantaneously and automatically without the user having to provide updates of his current status or location. Thus the problem of the user forgetting to make such updates is avoided as well as each user is provided with instant information as to the status and/or location of all the users.

In the system as described above, each user is provided with a wired or wireless device functioning as the user's Internet station and a location indicating method for the wireless devices. The location indicating wireless device can be the user's Internet station, by which the user communicates with the other users by e-mail and instant messages. Subsequently, other modifications may be made to the above-identified system without departing from the spirit and scope of the invention.

What is claimed is:

1. A method for updating status within a network that supports an instant messaging system for communicating instant messages amongst a plurality of wired or wireless devices, comprising:

determining the position of a wireless device;

associating the position with a location tag; and transmitting a status update message that contains the location tag via the instant messaging system to at least one other wired or wireless device over the network.

2. The method of claim 1, wherein the position is determined by the wireless device.

3. The method of claim 1, wherein the position is determined using a network-assisted positioning method.

4. The method of claim 1, wherein a client device associates the position with the location tag.

5. The method of claim 4, wherein the client device is the wireless device that associates the position with the location tag.

6. The method of claim 1, wherein a server associates the position with the location tag.

7. The method of claim 6, wherein the server is a proxy server.

8. A network that supports an instant messaging system for communicating instant messages amongst a plurality of wired or wireless devices, comprising:

a wireless device;

a positioning device that determines the position of the wireless device, wherein the position is associated with a location tag; and a transmitter that sends a status update message that includes the location tag via the instant messaging system to at least one other wired or wireless device over the network.

9. The network of claim 8, wherein the positioning device is incorporated within the wireless device.

10. The network of claim 8, wherein the positioning device uses a network-assisted positioning method.

11. The network of claim 8, wherein a client device associates the position with the location tag.

12. The network of claim 11, wherein the client device is the wireless device.

13. The network of claim 8, wherein a server associates the position with the location tag.

14. The network of claim 13, wherein the server is a proxy server.

15. A wireless device that operates within a network that supports an instant messaging system for communicating instant messages, comprising:

a transmitter that transmits a status update message containing a location tag via the instant messaging system over the network, wherein a position of the wireless device is associated with the location tag.

16. The wireless device of claim 15, further including a positioning device that determines position data.

17. The wireless device of claim 15, wherein the position is determined using a network-assisted positioning method.

18. The wireless device of claim 15, wherein a client device associates the position with the location tag.

19. The wireless device of claim 18, wherein the client device is the wireless device.

20. The wireless device of claim 15, wherein a server associates the position with the location tag.

* * * * *